(12) United States Patent
Iji et al.

(10) Patent No.: US 6,284,824 B1
(45) Date of Patent: Sep. 4, 2001

(54) FLAME RETARDANT POLYCARBONATE RESIN COMPOSITIONS

(75) Inventors: Masatoshi Iji; Shin Serizawa, both of Tokyo; Akira Yamamoto, Usui-gun; Masaaki Yamaya, Usui-gun; Kenji Yamamoto, Usui-gun; Yoshiteru Kobayashi, Usui-gun, all of (JP)

(73) Assignees: NEC Corporation; Shin-Etsu Chenical Co., Ltd., both of Tokyo (JP)

(*) Notice: Subject to any disclaimer, the term of this patent is extended or adjusted under 35 U.S.C. 154(b) by 0 days.

(21) Appl. No.: 09/185,508

(22) Filed: Nov. 4, 1998

(30) Foreign Application Priority Data

Nov. 5, 1997 (JP) .................................................. 9-319039

(51) Int. Cl.$^7$ ........................................................ C08J 3/00
(52) U.S. Cl. ............................ 524/267; 524/268; 525/393
(58) Field of Search ................................... 524/267, 268; 525/393

(56) References Cited

U.S. PATENT DOCUMENTS

| | | | | | |
|---|---|---|---|---|---|
| 4,197,384 | * | 4/1980 | Bialous | ................ | 525/464 |
| 5,157,065 | * | 10/1992 | Fuhr | ................ | 524/141 |
| 5,266,618 | * | 11/1993 | Watanabe | ............. | 524/405 |
| 5,449,710 | * | 9/1995 | Umeda | ................ | 524/165 |
| 6,001,921 | * | 12/1999 | Serizawa | .............. | 524/506 |

* cited by examiner

Primary Examiner—Margaret Medley
Assistant Examiner—Cephia D. Toomer
(74) Attorney, Agent, or Firm—Millen, White, Zelano & Branigan, P.C.

(57) ABSTRACT

A polycarbonate composition comprising an aromatic polycarbonate resin and an organopolysiloxane having a specific structure is flame retardant, evolves no harmful gases upon combustion, and is molded into parts with optical transparency.

20 Claims, No Drawings

FLAME RETARDANT POLYCARBONATE RESIN COMPOSITIONS

BACKGROUND OF THE INVENTION

1. Field of the Invention

This invention relates to a flame retardant polycarbonate resin composition having improved optical transparency.

2. Prior Art

Flame retardant resin compositions are often used in various products such as electric and electronic parts, building members, automotive parts, and daily goods. These resin compositions are generally made flame retardant by adding organic halogen compounds optionally in admixture with antimony trioxide. However, these flame retardant resin compositions have the drawback that harmful halogen gases evolve upon combustion.

It is also known that resin compositions can be made flame retardant by adding silicone resins which do not evolve harmful gases.

JP-B 60421/1987 discloses a flame retardant resin composition comprising an organic resin and a silicone resin containing at least 80% by weight of trifunctional siloxane units. In consideration of the melt processing with the organic resin, a silicone resin consisting essentially of trifunctional siloxane units is used. Since such a silicone resin imparts less flame retardance, more than 10% by weight of the silicone resin must be added in order to achieve a satisfactory flame retardant effect.

JP-B 31513/1988 discloses a thermal oxidation resistant resin composition in which an alkoxy-terminated silicone resin is added. A liquid low molecular weight silicone resin having a high alkoxy group content is used. The silicone of this type, even when added in a minor amount, can have substantial influence on the outer appearance and strength of molded resin parts and tends to bleed out of molded resin parts. The silicone of this type is susceptible to hydrolysis to form as by-products flammable low-melting compounds such as alcohols. Then, no satisfactory flame retardant effect is expected.

JP-B 48947/1991, 78171/1996, and 33971/1996 disclose flame retardant resin compositions in which silicone resins consisting of monofunctional and tetrafunctional siloxane units are added. JP-A 128434/1995 discloses a flame retardant resin composition in which a silicone resin containing vinyl-bearing siloxane units is added. However, in order for these compositions to exert satisfactory flame retardant effects, the amount of silicone resin must be increased, and inorganic fillers such as aluminum hydroxide must be used in admixture with halogen or phosphorus compounds.

As discussed above, the addition of silicone resins arises the problem that no satisfactory flame retardant effect is obtained unless the amount of silicone resin added is increased, whereas an increased amount of silicone resin can drastically exacerbate the moldability of resin compositions and the outer appearance and mechanical strength of molded resin parts. Efforts were made to develop silicone resin additives having more flame retardant effect or additives capable of cooperating with silicone resins to improve their flame retardant effect.

JP-A 176425/1996 discloses a flame retardant resin composition comprising a polycarbonate resin, an epoxybearing organopolysiloxane, and an alkali metal salt of an organic sulfonic acid. JP-A 176427/1996 discloses a flame retardant resin composition comprising a polycarbonate resin, a polycarbonate resin modified with a phenolic hydroxyl-bearing organopolysiloxane, and an organic alkali metal salt. Further, JP-A 169914/1997 discloses a composition wherein a petroleum heavy oil or pitch is combined with a silicone compound for improving flame retardance. These silicone resins having special organic functional groups are expensive because of the complication of their preparation process, but do not achieve a sufficient flame retardant effect to compensate for the increased cost. Also, the heavy oil and pitch have disadvantage on moldability of the plastic containing them. In this regard, a further improvement is desired.

The above-mentioned prior art silicone resins for imparting flame retardance are less dispersible in or less compatible with polycarbonate resins. As a result, there are obtained molded parts of the island-in-sea structure in which two components having different indexes of refraction are present as separate phases. These molded parts have a low transparency and are even opaque when large amounts of the silicone resins are blended.

It is thus desired to have a technique of imparting flame retardance to polycarbonate resins while maintaining the physical properties and optical transparency thereof.

SUMMARY OF THE INVENTION

We have found that when an organopolysiloxane having a high content of phenyl groups each directly attached to a silicon atom, a specific structure, and a specific molecular weight is added to and mixed with a polycarbonate resin, there is obtained a polycarbonate resin composition which can be molded and cured into a product having improved flame retardance while maintaining the physical properties, typically mechanical strength, and optical transparency inherent to the polycarbonate resin.

According to a first aspect, the invention provides a flame retardant polycarbonate composition comprising (a) 100 parts by weight of an aromatic polycarbonate resin and (b) 1 to 10 parts by weight of an organopolysiloxane consisting essentially of 50 to 90 mol % of siloxane units T represented by $R^1.SiO_{3/2}$ and 10 to 50 mol % of siloxane units D represented by $R^2R^3.SiO_{2/2}$ wherein $R^1$, $R^2$, and $R^3$ are independently substituted or unsubstituted monovalent hydrocarbon groups having 1 to 10 carbon atoms, phenyl being contained in an amount of at least 80 mol % of the entire organic substituents.

According to a second aspect, the invention provides a flame retardant polycarbonate composition comprising (a) 100 parts by weight of an aromatic polycarbonate resin and (b') 1 to 10 parts by weight of an organopolysiloxane consisting essentially of 0 to 89.99 mol % of siloxane units T represented by $R^1.SiO_{3/2}$, 10 to 50 mol % of siloxane units D represented by $R^2R^3.SiO_{2/2}$, and 0.01 to 50 mol % of siloxane units Q represented by $SiO_{4/2}$ wherein $R^1$, $R^2$, and $R^3$ are independently substituted or unsubstituted monovalent hydrocarbon groups having 1 to 10 carbon atoms, phenyl being contained in an amount of at least 80 mol % of the entire organic substituents.

According to the invention, since an organopolysiloxane of the specific structure free of special organic functional groups is added to a polycarbonate resin, the resulting flame retardant resin composition does not evolve harmful gases when burned by a fire or incinerated for disposal and is thus safe and imposes a little burden to the environment. As a result of the selection of the organopolysiloxane of the specific structure free of special organic functional groups, small amounts of the organopolysiloxane added can achieve a satisfactory flame retardant effect, little affect the moldability of the resin composition and the outer appearance and physical properties (mechanical strength) of molded parts thereof, and are economically advantageous. Since the organopolysiloxane of the specific structure is well dispersible in and compatible with the polycarbonate resin and imparts a sufficient flame retardant effect even with small amounts, the flame retardant resin composition has a high optical transparency.

DETAILED DESCRIPTION OF THE INVENTION

Component (a) of the flame retardant resin composition according to the invention is an aromatic polycarbonate resin which may be prepared by reacting a dihydric phenol with phosgene or carbonate diester. The dihydric phenol is preferably selected from bisphenols such as 2,2-bis(4-hydroxyphenyl)propane. It is acceptable to partially or entirely replace 2,2-bis(4-hydroxyphenyl)propane by another dihydric phenol. The dihydric phenols other than 2,2-bis(4-hydroxyphenyl)propane include, for example, hydroquinone, 4,4-dihydroxyphenyl, bis(4-hydroxyphenyl) sulfide, bis(4-hydroxyphenyl)sulfone, and bis(4-hydroxyphenyl)ketone. There may be used homopolymers of these dihydric phenols alone or copolymers of two or more of these dihydric phenols or blends thereof.

An organopolysiloxane is added to the aromatic polycarbonate resin. This is generally designated component (B) including component (b) and component (b').

Component (b)

Component (b) is an organopolysiloxane consisting essentially of 50 to 90 mol %, preferably 60 to 80 mol % of siloxane units T represented by $R^1.SiO_{3/2}$ and 10 to 50 mol %, preferably 20 to 40 mol % of siloxane units D represented by $R^2R^3.SiO_{2/2}$, phenyl being contained in an amount of at least 80 mol % of the entire organic substituents.

Component (b')

Component (b') is an organopolysiloxane consisting essentially of 0 to 89.99 mol %, preferably 10 to 79.99 mol % of siloxane units T represented by $R^1.SiO_{3/2}$, 10 to 50 mol %, preferably 20 to 40 mol % of siloxane units D represented by $R^2R^3.SiO_{2/2}$, and 0.01 to 50 mol % of siloxane units Q represented by $SiO_{4/2}$, phenyl being contained in an amount of at least 80 mol % of the entire organic substituents.

Herein, $R^1$, $R^2$, and $R^3$ are independently substituted or unsubstituted monovalent hydrocarbon groups having 1 to 10 carbon atoms, for example, alkyl groups such as methyl, ethyl, propyl, butyl, hexyl, cyclohexyl and decyl, alkenyl groups such as vinyl, propenyl, acryloxypropyl, and methacryloxypropyl, aryl groups such as phenyl, and aralkyl groups such as benzyl. Phenyl and methyl are industrially advantageous.

At the ends of the organopolysiloxane, there may be some silanol and/or alkoxy groups. A smaller amount of silanol or alkoxy groups is preferable for the stability during storage and stability during melt processing of the organopolysiloxane. Illustratively, the amount of silanol groups is preferably not greater than 0.25 mol per 100 g of the organopolysiloxane, and the amount of alkoxy groups is preferably not greater than 0.16 mol per 100 g of the organopolysiloxane. These organopolysiloxanes do not evolve harmful gases when burned.

Although the organopolysiloxane as component (B) does not possess crosslinkable organic functional groups except for small amounts of silanol or alkoxy groups, even small amounts of 10% by weight or less of the organopolysiloxane can impart flame retardance. When the composition is burned, the organopolysiloxane having a high phenyl content may readily form an incombustible Si—C ceramic layer with the aromatic polycarbonate resin by mutual coupling of aromatic rings in both the components, thereby exerting a flame retardant effect. On account of this flame retarding mechanism, crosslinkable functional groups such as silanol and alkoxy groups are not necessarily required. The organopolysiloxane may have an alkoxy group content of 5% by weight or less.

Not only the flame retardance of the resin composition, but also the optical transparency are largely affected by the phenyl content of the organopolysiloxane. As the phenyl content becomes higher, the organopolysiloxane becomes more dispersible in or compatible with the polycarbonate resin and the flame retardant polycarbonate resin composition has a higher optical transparency. The phenyl content within which both flame retardance and optical transparency are ensured is at least 80 mol % of the entire organic substituents (that is, the total amount of $R^1$, $R^2$ and $R^3$ attached to silicon atoms). A phenyl content of less than 80 mol % would invite a substantial drop of optical transparency, failing to impart both flame retardance and optical transparency. If all the substituents are phenyl groups, sterically bulky phenyl groups cause a steric hindrance to prevent aromatic rings from fully condensing by overlapping each other, failing to achieve satisfactory flame retardance. For this reason, the preferred phenyl content is more than 80 mol %, especially from more than 80 mol % to 95 mol %.

Another feature of the organopolysiloxane used herein is the essential inclusion of difunctional siloxane units (D units) represented by $R^2R^3.SiO_{2/2}$. In order to impart improved flame retardance on the basis of the above-mentioned flame retarding mechanism, aromatic rings in the polycarbonate resin and aromatic rings in the silicone resin must condense by overlapping each other. Silicone resins consisting solely of T units are effective for reinforcement because of their robust structure, but lack a degree of spatial freedom and must be added in large amounts in order to achieve satisfactory flame retardance as described in the preamble, which is economically disadvantageous and adversely affects the mechanical properties and optical transparency of molded parts. We have found that a certain degree of spatial freedom is necessary for silicone resins, and the inclusion in silicone resins of a certain amount of D units for imparting flexibility is effective to this end.

More particularly, silicone resins are generally constructed by a combination of trifunctional siloxane units (T units), difunctional siloxane units (D units), and tetrafunctional siloxane units (Q units). The combinations preferred in the invention are systems containing D units, such as a T/D system, T/D/Q system, and D/Q system because these systems are successful in imparting satisfactory flame retardance. In any of these combinations, D units should be contained in an amount of 10 to 50 mol %. If the content of D units is less than 10 mol %, silicone resins lack flexibility, eventually failing to achieve sufficient flame retardance. If the content of D units is more than 50 mol %, silicone resins are less dispersible in or less workable with the aromatic polycarbonate resin, adversely affecting the outer appearance and optical transparency of molded parts. The D unit content should preferably be 20 to 40 mol %. As long as the D unit content is in the above range, the content of T units is 50 to 90 mol % for the T/D system, and the content of T units is 0 to 89.99 mol %, preferably 10 to 79.99 mol % and the content of Q units is 0.01 to 50 mol % for the T/D/Q or D/Q system. As long as a degree of spatial freedom is available, it is more advantageous for reproducing flame retardance to contain a more amount of Q units having a high degree of oxidation. However, if more than 50 mol % of Q units are present in the siloxane resin, the resin has an enhanced inorganic microparticulate character and becomes less dispersible in the aromatic polycarbonate resin. For this reason, the content of Q units should be not more than 50 mol %. In the above-described range of the siloxane unit content, a choice is desirably made of the region where T units account for 50 to 80 mol % of the organopolysiloxane, when a balance of flame retardance, workability, and molded part properties are taken into account.

The preferred siloxane units are illustrated below. Preferred examples of the trifunctional siloxane units (T units) are

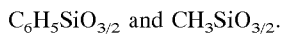
$C_6H_5SiO_{3/2}$ and $CH_3SiO_{3/2}$.
Preferred examples of the difunctional siloxane units (D units) are

$(C_6H_5)_2SiO_{2/2}$, $(CH_3)C_6H_5SiO_{2/2}$, and $(CH_3)_2SiO_{2/2}$.

Dimethylsiloxane units $((CH_3)_2SiO_{2/2})$ as the D unit are most effective for imparting flexibility to the silicone resin, but tend to reduce the compatibility with the polycarbonate resin and consequently, opacify molded parts thereof. Due to the absence of phenyl groups, the dimethylsiloxane units are not effective for improving flame retardance. It is thus undesirable to contain a large amount of dimethylsiloxane units. Therefore, it is desirable to restrict the content of dimethylsiloxane units to 50 mol % or less of the D units. Methylphenylsiloxane units $((CH_3)C_6H_5SiO_{2/2})$ are most preferable since they can impart flexibility and increase the phenyl content at the same time. Diphenylsiloxane units $((C_6H_5)_2SiO_{2/2})$ are superior in maintaining a high phenyl content, but because of the structure in which bulky phenyl groups concentrate on one silicon atom, blending a large amount of diphenylsiloxane units introduces a substantial steric hindering structure into the organopolysiloxane molecule. This reduces the degree of spatial freedom of the siloxane skeleton and makes difficult the overlapping and condensing of aromatic rings which is required for the flame retarding mechanism based on the mutual coupling of aromatic rings to exert, resulting in a decline of flame retardant effect. Therefore, the D units obtained by blending these three components so as to meet the above-defined range may be used although it is preferred to use methylphenylsiloxane units as the majority.

As long as the respective T, D and Q units satisfy the above-defined ranges, the organopolysiloxane as component (B) may contain siloxane units (M units) represented by $R^4R^5R^6SiO_{1/2}$ wherein $R^4$, $R^5$ and $R^6$ are as defined for $R^1$, $R^2$ and $R^3$, but in the amount that does not adversely affect physical properties.

The organopolysiloxane as component (B) preferably has a weight average molecular weight Mw of about 2,000 to 50,000. An organopolysiloxane with a Mw of less than 2,000 would remain unstable when mixed with and dispersed in the aromatic polycarbonate resin. An organopolysiloxane with a Mw of more than 50,000 has a high softening temperature and would be difficult to uniformly disperse in the aromatic polycarbonate resin. The more preferred range of Mw is about 5,000 to 30,000.

The organopolysiloxanes can be prepared by well-known methods. For example, an organochlorosilane and/or an organoalkoxysilane capable of hydrolytic condensation reaction to form the above-described siloxane units or partially hydrolyzed condensates thereof are mixed in a solvent mixture of an excess of water for hydrolyzing all hydrolyzable groups (chloro and alkoxy groups) and an organic solvent in which the starting silane compound(s) and the resulting organopolysiloxane are soluble, whereby hydrolytic condensation reaction is carried out. An organopolysiloxane having the desired weight average molecular weight can be obtained by controlling the reaction temperature and time and the amount of water and organic solvent used. On use, the unnecessary organic solvent is removed from the organopolysiloxane, which is optionally powdered.

In the flame retardant polycarbonate composition, the organopolysiloxane is blended in an amount of 1 to 10 parts, preferably 2 to 8 parts by weight per 100 parts by weight of the polycarbonate resin. Less than 1 part of the organopolysiloxane is insufficient to impart flame retardance whereas more than 10 parts can adversely affect the outer appearance and optical transparency of molded parts. The organopolysiloxanes do not evolve harmful gases when burned.

In the flame retardant polycarbonate composition according to the invention, any of well-known additives may be blended, for example, flame retardant aids, reinforcing agents, antioxidants, neutralizing agents, UV absorbers, antistatic agents, pigments, dispersants, lubricants, and thickeners.

In preparing the composition of the invention, the above essential and optional components are metered and mixed using equipment and methods commonly used in the manufacture of prior art rubber and plastic compositions. More particularly, the components are fully mixed and dispersed by an agitating mixer such as a ribbon blender or Henschel mixer, and the mixture is further kneaded in a melt kneader such as a Banbury mixer or extruder, thereby obtaining the desired composition.

In molding the composition of the invention, any of well-known molding methods such as injection molding, extrusion molding, compression molding and vacuum forming may be used.

There has been described a resin composition comprising an aromatic polycarbonate resin blended with an organopolysiloxane having a specific structure whereby the resin is made flame retardant while eliminating the risk of evolving harmful gases on combustion. Parts molded from the composition have satisfactory optical transparency.

EXAMPLE

Examples of the invention are given below by way of illustration and not by way of limitation.

Preparation Example 1

A 1-liter flask equipped with a stirrer, condenser and thermometer was charged with 450 g (25 mol) of water and 143 g of toluene and heated to an internal temperature of 80° C. in an oil bath. A dropping funnel was charged with 148 g (0.7 mol) of phenyltrichlorosilane, 23 g (0.09 mol) of diphenyldichlorosilane, 21 g (0.11 mol) of methylphenyldichlorosilane, and 17 g (0.1 mol) of tetrachlorosilane. With stirring, the silane mixture was added dropwise to the flask over one hour. After the completion of dropwise addition, the contents were stirred for a further one hour at an internal temperature of 80° C. for ripening. The reaction solution was cooled to room temperature and allowed to stand for phase separation. The resulting aqueous phase was removed. Subsequently, the solvent phase was mixed with a 10% aqueous solution of sodium sulfate and stirred for 10 minutes, the solution was allowed to stand for 30 minutes for phase separation, and the resulting aqueous phase was removed. The reaction was stopped by repeating this water washing step until the toluene phase became neutral. With an ester adapter attached to the flask, the organopolysiloxane-containing toluene phase was heated under reflux for removing water from the toluene phase. After the internal temperature reached 110° C., the flask was kept heated for a further one hour, followed by cooling to room temperature. The thus obtained organopolysiloxane solution was filtered to remove the insoluble and subjected to vacuum distillation to remove the toluene, obtaining 116 g of a solid organopolysiloxane.

The organopolysiloxane thus obtained consisted of 70 mol % (70 wt %) of T units, 20 mol % of D units, and 10 mol % of Q units, contained phenyl groups in an amount of 90 mol % of the organic substituents on silicon atoms, and contained at terminal ends 0.19 mol of silanol groups per 100 g of the organopolysiloxane. It was a solid with a colorless transparent outer appearance and had a weight average molecular weight of 16,700.

Preparation Example 2

A 1-liter flask equipped with a stirrer, condenser and thermometer was charged with 23 g of methanol, 120 g of toluene, 158 g (0.8 mol) of phenyltrimethoxysilane, 24 g (0.1 mol) of diphenyldimethoxysilane, and 18 g (0.1 mol) of methylphenyldimethoxysilane. With stirring at room temperature, 432 g (24 mol) of an aqueous 0.1N hydrochloric acid solution was added dropwise to the flask over one hour. At the end of addition, the flask was heated to an internal temperature of 80° C. while distilling off the methanol by-product. Stirring was continued at 80° C. for one hour for ripening. The reaction solution was cooled to room temperature and allowed to stand for phase separation. The resulting aqueous phase was removed. Subsequently, the solvent phase was mixed with a 10% aqueous solution of sodium sulfate and stirred for 10 minutes, the solution was allowed to stand for 30 minutes for phase separation, and the resulting aqueous phase was removed. The reaction was stopped by repeating this water washing step until the toluene phase became neutral. With an ester adapter attached to the flask, the organopolysiloxane-containing toluene phase was heated under reflux for removing water from the toluene phase. After the internal temperature reached 110° C., the flask was kept heated for a further one hour, followed by cooling to room temperature. The thus obtained organopolysiloxane solution was filtered to remove the insoluble and subjected to vacuum distillation to remove toluene, obtaining 123 g of a solid organopolysiloxane.

The organopolysiloxane thus obtained consisted of 80 mol % (76 wt %) of T units and 20 mol % of D units, contained phenyl groups in an amount of 92 mol % of the organic substituents on silicon atoms, and contained at terminal ends 0.12 mol of silanol groups and 0.03 mol of methoxy groups per 100 g of the organopolysiloxane. It was a solid with a colorless transparent outer appearance and had a weight average molecular weight of 5,700.

Preparation Example 3

The procedure of Preparation Example 1 was repeated except that the 1-liter flask was charged with 432 g (24 mol) of water and 130 g of toluene and the dropping funnel was charged with 169 g (0.8 mol) of phenyltrichlorosilane and 38 g (0.2 mol) of methylphenyldichlorosilane. There was obtained 177 g of a solid organopolysiloxane.

The organopolysiloxane consisted of 80 mol % (79 wt %) of T units and 20 mol % of D units, contained phenyl groups in an amount of 83 mol % of the organic substituents on silicon atoms, and contained at terminal ends 0.16 mol of silanol groups per 100 g of the organopolysiloxane. It was a solid with a colorless transparent outer appearance and had a weight average molecular weight of 11,600.

Preparation Example 4

The procedure of Preparation Example 1 was repeated except that the 1-liter flask was charged with 234 g (13 mol) of water and 37 g of toluene and the dropping funnel was charged with 148 g (0.7 mol) of phenyltrichlorosilane and 76 g (0.3 mol) of diphenyldichlorosilane. There was obtained 135 g of a solid organopolysiloxane.

The organopolysiloxane consisted of 70 mol % (60 wt %) of T units and 30 mol % of D units, contained phenyl groups in an amount of 100 mol % of the organic substituents on silicon atoms, and contained at terminal ends 0.12 mol of silanol groups per 100 g of the organopolysiloxane. It was a solid with a colorless transparent outer appearance and had a weight average molecular weight of 12,500.

Preparation Example 5

The procedure of Preparation Example 1 was repeated except that the 1-liter flask was charged with 234 g (13 mol) of water and 47 g of toluene and the dropping funnel was charged with 127 g (0.6 mol) of phenyltrichlorosilane, 71 g (0.28 mol) of diphenyldichlorosilane, and 15 g (0.12 mol) of dimethyldichlorosilane. There was obtained 128 g of a solid organopolysiloxane.

The organopolysiloxane consisted of 60 mol % (54 wt %) of T units and 40 mol % of D units, contained phenyl groups in an amount of 83 mol % of the organic substituents on silicon atoms, and contained at terminal ends 0.12 mol of silanol groups per 100 g of the organopolysiloxane. It was a solid with a colorless transparent outer appearance and had a weight average molecular weight of 18,500.

Preparation Example 6

The procedure of Preparation Example 1 was repeated except that the 1-liter flask was charged with 234 g (13 mol) of water and 36 g of toluene, the dropping funnel was charged with 169 g (0.8 mol) of phenyltrichlorosilane and 50.6 g (0.2 mol) of diphenyldichlorosilane, and the agitation for ripening after the completion of chlorosilane addition was continued at an internal temperature of 80° C. for 3 hours. There was obtained 129 g of a solid organopolysiloxane.

The organopolysiloxane consisted of 80 mol % (72 wt %) of T units and 20 mol % of D units, contained phenyl groups in an amount of 100 mol % of the organic substituents on silicon atoms, and contained at terminal ends 0.12 mol of silanol groups per 100 g of the organopolysiloxane. It was a solid with a colorless transparent outer appearance and had a weight average molecular weight of 34,000.

Preparation Example 7

The procedure of Preparation Example 1 was repeated except that the 1-liter flask was charged with 216 g (12 mol) of water and 17 g of toluene and the dropping funnel was charged with 101 g (0.48 mol) of phenyltrichlorosilane, 81 g (0.37 mol) of diphenyldichlorosilane, and 26 g (0.15 mol) of dimethyldichlorosilane. There was obtained 126 g of an organopolysiloxane.

The organopolysiloxane consisted of 48 mol % (44 wt %) of T units and 52 mol % of D units, contained phenyl groups in an amount of 80 mol % of the organic substituents on silicon atoms, and contained at terminal ends 0.13 mol of silanol groups per 100 g of the organopolysiloxane. It was a viscous liquid with a colorless transparent outer appearance and had a weight average molecular weight of 4,400.

Preparation Example 8

The procedure of Preparation Example 1 was repeated except that the 1-liter flask was charged with 450 g (25 mol) of water and 198 g of toluene and the dropping funnel was charged with 201 g (0.95 mol) of phenyltrichlorosilane and 13 g (0.05 mol) of diphenyldichlorosilane. There was obtained 119 g of a solid organopolysiloxane.

The organopolysiloxane consisted of 95 mol % (93 wt %) of T units and 5 mol % of D units, contained phenyl groups in an amount of 100 mol % of the organic substituents on silicon atoms, and contained at terminal ends 0.16 mol of silanol groups per 100 g of the organopolysiloxane. It was a solid with a colorless transparent outer appearance and had a weight average molecular weight of 12,500.

Preparation Example 9

The procedure of Preparation Example 1 was repeated except that the 1-liter flask was charged with 432 g (24 mol) of water and 118 g of toluene and the dropping funnel was charged with 169 g (0.8 mol) of phenyltrichlorosilane, 12 g (0.08 mol) of methyltrichlorosilane, and 15 g (0.12 mol) of dimethyldichlorosilane. There was obtained 106 g of a solid organopolysiloxane.

The organopolysiloxane consisted of 88 mol % (92 wt %) of T units and 12 mol % of D units, the D units consisted of 100 mol % of dimethylsiloxane units, phenyl groups accounted for 71 mol % of the organic substituents on silicon atoms, and there were contained at terminal ends 0.16 mol of silanol groups per 100 g of the organopolysiloxane. It was a solid with a colorless transparent outer appearance and had a weight average molecular weight of 17,800.

Preparation Example 10

A 1-liter flask equipped with a stirrer, condenser and thermometer was charged with 23 g of methanol, 120 g of toluene, 40 g (0.2 mol) of phenyltrimethoxysilane, 49 g (0.2 mol) of diphenyldimethoxysilane, and 91 g (0.6 mol) of tetramethoxysilane. With stirring at room temperature, 29 g (1.6 mol) of an aqueous 0.5N hydrochloric acid solution was added dropwise to the flask over 10 minutes. At the end of addition, the flask was heated to an internal temperature of 80° C. while distilling off the methanol by-product. Stirring was continued at 80° C. for one hour for ripening. The reaction solution was cooled to room temperature, mixed with 15 g of calcium carbonate, stirred for 6 hours, and filtered to remove the neutralization salt and unreacted reactants. Subsequent vacuum distillation to remove toluene yielded 90 g of an organopolysiloxane.

The organopolysiloxane thus obtained consisted of 20 mol % (24 wt %) of T units, 20 mol % of D units, and 60 mol % of Q units, contained phenyl groups in an amount of 100 mol % of the organic substituents on silicon atoms, and contained at terminal ends 0.03 mol of silanol groups and 0.23 mol of methoxy groups per 100 g of the organopolysiloxane. It was a viscous liquid with a colorless transparent outer appearance and had a weight average molecular weight of 1,500.

Preparation Example 11

The procedure of Preparation Example 1 was repeated except that the 1-liter flask was charged with 216 g (12 mol) of water and 16 g of toluene, the dropping funnel was charged with 169 g (0.8 mol) of phenyltrichlorosilane and 50.6 g (0.2 mol) of diphenyldichlorosilane, and the agitation for ripening after the completion of chlorosilane addition was continued at an internal temperature of 80° C. for 3 hours. There was obtained 129 g of a solid organopolysiloxane.

The organopolysiloxane consisted of 80 mol % (72 wt %) of T units and 20 mol % of D units, contained phenyl groups in an amount of 100 mol % of the organic substituents on silicon atoms, and contained at terminal ends 0.08 mol of silanol groups per 100 g of the organopolysiloxane. It was a solid with a colorless transparent outer appearance and had a weight average molecular weight of 79,000.

Examples 1–6 & Comparative Examples 1–6

In accordance with the formulation shown in Table 1, a polycarbonate resin was blended with 5% by weight of the organopolysiloxanes obtained in Preparation Examples. Each blend was premixed in an automatic mortar and melt kneaded in a single-screw extruder at a temperature of 260° C. The polycarbonate resin used was Calibre® 200-20 having a viscosity average molecular weight of about 20,000 commercially available from Sumitomo-Dow K.K. The compositions were examined for oxygen index, flame retardance, and optical transparency.

The oxygen index was measured by the polymer burning test according to the oxygen index method JIS K7201.

The flame retardance was examined in accordance with the test procedure set forth in Underwriters' Laboratories, Inc. Bulletin 94, Burning test for Classifying Materials (hereinafter referred to as UL-94). A total burning time was determined by using five test bars of 3.2 mm thick, measuring a flaming time after removal of the igniting flame, and summing the five flaming times.

The optical transparency was measured by means of a visible absorption spectrophotometer. Using a molded plate of 10 mm thick, a visible light transmittance across a light path length of 10 mm in the thickness direction was measured. Samples were rated "Pass" when the transmittance was 70% or higher and "Reject" when the transmittance was less than 70%.

The results are shown in Table 1.

TABLE 1

|  | Polycarbonate resin | Organopolysiloxane | Trans-mittance | Oxygen index (%) | Total burning time (sec.) |
| --- | --- | --- | --- | --- | --- |
| E1 | Calibre 200-20 | Preparation Example 1 | Pass | 33 | 28 |
| E2 | Calibre 200-20 | Preparation Example 2 | Pass | 32 | 35 |
| E3 | Calibre 200-20 | Preparation Example 3 | Pass | 31 | 48 |
| E4 | Calibre 200-20 | Preparation Example 4 | Pass | 31 | 45 |
| E5 | Calibre 200-20 | Preparation Example 5 | Pass | 30 | 56 |
| E6 | Calibre 200-20 | Preparation Example 6 | Pass | 31 | 52 |

TABLE 1-continued

| | Polycarbonate resin | Organopolysiloxane | Trans-mittance | Oxygen index (%) | Total burning time (sec.) |
|---|---|---|---|---|---|
| CE1 | Calibre 200-20 | Preparation Example 7 | Reject | 29 | 71 |
| CE2 | Calibre 200-20 | Preparation Example 8 | Pass | 25 | 103 |
| CE3 | Calibre 200-20 | Preparation Example 9 | Reject | 28 | 81 |
| CE4 | Calibre 200-20 | Preparation Example 10 | Reject | 27 | 90 |
| CE5 | Calibre 200-20 | Preparation Example 11 | Reject | 29 | 75 |
| CE6 | Calibre 200-20 | No silicone blended | Pass | 26 | 120 |

It is noted that in the burning test on Comparative Example 6, two of the five test bars dropped particles while the bars kept flaming, and thus the flaming time was measured.

Japanese Patent Application No. 319039/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A flame retardant polycarbonate resin composition comprising
   (a) 100 parts by weight of an aromatic polycarbonate resin and
   (b) 1 to 10 parts by weight of an organopolysiloxane consisting essentially of 50 to 90 mol % of siloxane units T represented by $R^1.SiO_{3/2}$ and 10 to 50 mol % of siloxane units D represented by $R^2R^3.SiO_{2/2}$ wherein $R^1$, $R^2$, and $R^3$ are independently substituted or unsubstituted monovalent hydrocarbon groups having 1 to 10 carbon atoms, phenyl being contained in an amount of at least 83 mol % of the entire organic substituents.

2. The composition of claim 1, wherein the organopolysiloxane (b) consists essentially of 60 to 80 mol % of siloxane units T represented by $R^1.SiO_{3/2}$ and 20 to 40 mol % of siloxane units D represented by $R^2R^3.SiO_{2/2}$ wherein $R^1$, $R^2$, and $R^3$ are as defined above.

3. The composition of claim 1, wherein the siloxane units D in the organopolysiloxane (b) contain up to 50 mol % of dimethylsiloxane units represented by $(CH_3)_2SiO_{2/2}$.

4. The composition of claim 1, wherein the organopolysiloxane (b) has a weight average molecular weight of 2,000 to 50,000.

5. A flame retardant polycarbonate resin composition comprising
   (a) 100 parts by weight of an aromatic polycarbonate resin and
   (b') 1 to 10 parts by weight of an organopolysiloxane consisting essentially of 0 to 89.99 mol % of siloxane units T represented by $R^1.SiO_{3/2}$, 10 to 50 mol % of siloxane units D represented by $R^2R^3.SiO_{2/2}$, and 0.01 to 50 mol % of siloxane units Q represented by $SiO_{4/2}$ wherein $R^1$, $R^2$, and $R^3$ are independently substituted or unsubstituted monovalent hydrocarbon groups having 1 to 10 carbon atoms, phenyl being contained in an amount of at least 83 mol % of the entire organic substituents.

6. The composition of claim 5, wherein the organopolysiloxane (b') consists essentially of 10 to 79.99 mol % of siloxane units T represented by $R^1.SiO_{3/2}$, 20 to 40 mol % of siloxane units D represented by $R^2R^3.SiO_{2/2}$, and 0.01 to 50 mol % of siloxane units Q represented by $SiO_{4/2}$ wherein $R^1$, $R^2$, and $R^3$ are as defined above.

7. The composition of claim 5, wherein the siloxane units D in the organopolysiloxane (b') contain up to 50 mol % of dimethylsiloxane units represented by $(CH_3)_2SiO_{2/2}$.

8. The composition of claim 5, wherein the organopolysiloxane (b') has a weight average molecular weight of 2,000 to 50,000.

9. The composition of claim 1, wherein the siloxane units D in the organopolysiloxane (b) contain methylphenylsiloxane units represented by $(CH_3)C_6H_5SiO_{2/2}$ and/or diphenylsiloxane units represented by $(C_6H_5)_2SiO_{2/2}$.

10. The composition of claim 1, wherein the organopolysiloxane is 2 to 8 parts by weight with respect to 100 parts by weight of the polycarbonate resin.

11. The composition of claim 1, wherein the siloxane units T in the organopolysiloxane (b) are represented by $C_6H_5SiO_{3/2}$ and/or $CH_3SiO_{3/2}$.

12. The composition of claim 1, wherein the $R^1$, $R^2$, and $R^3$ hydrocarbon groups are each alkyl groups, alkenyl groups, aryl groups and/or aralkyl groups.

13. The composition of claim 1 further comprising a flame retardant aid, a reinforcing agent, an antioxidant, a neutralizing agent, a UV absorber, an antistatic agent, a pigment, a dispersant, a lubricant, and/or a thickener.

14. The composition of claim 1 wherein the organopolysiloxane further comprises M siloxane units represented by $R^4R^5R^6SiO_{1/2}$ wherein $R_4$, $R_5$, and $R_6$ are independently substituted or unsubstituted monovalent hydrocarbon groups having 1 to 10 carbon atoms.

15. The composition of claim 5, wherein the siloxane units D in the organopolysiloxane (b) contain methylphenylsiloxane units represented by $(CH_3)C_6H_5SiO_{2/2}$ and/or diphenylsiloxane units represented by $(C_6H_5)_2SiO_{2/2}$.

16. The composition of claim 5, wherein the siloxane units T in the organopolysiloxane (b) are represented by $C_6H_5SiO_{3/2}$ and/or $CH_3SiO_{3/2}$.

17. The composition of claim 5, wherein the $R^1$, $R^2$, and $R^3$ hydrocarbon groups are each alkyl groups, alkenyl groups, aryl groups and/or aralkyl groups.

18. The composition of claim 5 further comprising a flame retardant aid, a reinforcing agent, an antioxidant, a neutralizing agent, a UV absorber, an antistatic agent, a pigment, a dispersant, a lubricant, and/or a thickener.

19. The composition of claim 5 wherein the organopolysiloxane further comprises M siloxane units represented by $R^4R^5R^6SiO_{1/2}$ wherein $R^4$, $R^5$, and $R^6$ are independently substituted or unsubstituted monovalent hydrocarbon groups having 1 to 10 carbon atoms.

20. A method of making a flame retardant polycarbonate resin comprising:
   providing 100 parts by weight of an aromatic polycarbonate resin prepared by reacting a dihydric phenol with a phosgene or a carbonate diester;
   mixing 1 to 10 parts by weight of an organopolysiloxane consisting essentially of 50 to 90 mol % of siloxane units T represented by $R^1.SiO_{3/2}$ and 10 to 50 mol % of siloxane units D represented by $R^2R^3.SiO_{2/2}$ wherein $R^1$, $R^2$, and $R^3$ are independently substituted or unsubstituted monovalent hydrocarbon groups having 1 to 10 carbon atoms, phenyl being contained in an amount of at least 83 mol % of the entire organic substituents.

* * * * *